(12) United States Patent
Lei et al.

(10) Patent No.: US 7,237,227 B2
(45) Date of Patent: Jun. 26, 2007

(54) APPLICATION USER INTERFACE TEMPLATE WITH FREE-FORM LAYOUT

(75) Inventors: Shu Lei, Belmont, CA (US); Yuhong Wang, Union City, CA (US); Russell Richardson, San Francisco, CA (US); Anil Mukundan, San Jose, CA (US); Vipul Shroff, Sunnyvale, CA (US); Isaac Levin, Sunnyvale, CA (US); Ravikumar Gampala, Dublin, CA (US)

(73) Assignee: Siebel Systems, Inc., San Mateo, CA (US)

( * ) Notice: Subject to any disclaimer, the term of this patent is extended or adjusted under 35 U.S.C. 154(b) by 31 days.

(21) Appl. No.: 10/634,326

(22) Filed: Aug. 4, 2003

(65) Prior Publication Data

US 2004/0268299 A1 Dec. 30, 2004

Related U.S. Application Data

(60) Provisional application No. 60/484,026, filed on Jun. 30, 2003.

(51) Int. Cl.
*G06F 9/44* (2006.01)
*G06F 9/455* (2006.01)

(52) U.S. Cl. .................... 717/110; 716/11; 717/113
(58) Field of Classification Search ............... 717/113, 717/100, 136, 101; 345/413; 706/45
See application file for complete search history.

(56) References Cited

U.S. PATENT DOCUMENTS

| 6,718,535 | B1* | 4/2004 | Underwood ............... 717/101 |
| 6,754,885 | B1* | 6/2004 | Dardinski et al. ......... 717/113 |
| 2003/0120711 | A1* | 6/2003 | Katz ......................... 709/106 |
| 2004/0044556 | A1* | 3/2004 | Brady et al. ................. 705/8 |
| 2004/0117773 | A1* | 6/2004 | Nicolle ...................... 717/136 |

OTHER PUBLICATIONS

"Microdoft Press Computer Dictionary", 3dr Edition, 1997, p. 238.*

* cited by examiner

*Primary Examiner*—Wei Zhen
*Assistant Examiner*—Chih-Ching Chow
(74) *Attorney, Agent, or Firm*—Campbell Stephenson Ascolese LLP

(57) ABSTRACT

Embodiments of the present invention provide methods and apparatuses for quickly and easily configuring an application user interface using a flexible generic layout file. For one embodiment, a free-form grid layout is provided that allows an application provider to create a desired number of placeholders, each of a desired size, by positioning objects at desired locations on the free-form grid. In this way the application provider configures the application user interface. For one embodiment, the placeholders are created by dragging selected objects, from a provided set of objects, onto the grid layout. For such an embodiment, a set of parameters that describe the objects on the grid layout (e.g., indicating number, size, and location) is stored to a database. At run-time, the parameters are used to dynamically generate HTML code, which when executed presents the application user interface.

25 Claims, 5 Drawing Sheets

CUSTOMIZATION OF
AN APPLICATION UI
USING TOOLS EDITER

FIG. 1A
(PRIOR ART)

CUSTOMIZATION
OF AN APPLICATION UI
REQUIRING EDITING OF
THE GENERIC LAYOUT
FILE

APPLICATION USER INTERFACE TEMPLATE WITH FREE-FORM LAYOUT

This application is a non-provisional application claiming priority to provisional application Ser. No. 60/484,026 filed Jun. 30, 2003 entitled "Application User Interface Template With Free-Form Layout," the teachings of which are incorporated by reference herein.

FIELD

Embodiments of the invention relate generally to the field of hyper text markup language ("HTML")-based applications and more specifically to methods and systems for creating, modifying, and presenting user interfaces ("UIs") (ie. the displays to the end-user) for such applications.

BACKGROUND

There has been a tremendous increase in the number and type of applications (user-oriented specific-function software) provided via internet-related networks (e.g., the World Wide Web ("WWW")) over the last decade. The application is created using an authoring language (e.g., HTML) that defines the structure and layout of the application UI. For example, HTML defines structure and layout using a variety of language element descriptors (e.g., tags and attributes). Typical web-based applications are presented using a client/server programming model. In such a model, an application provider provides the application on a server digital processing system ("DPS"), and an end-user of the application accesses the application via a client DPS. For example, for web-based applications, the server DPS houses a program that provides requested HTML to a client DPS when requested.

Figure 1A:
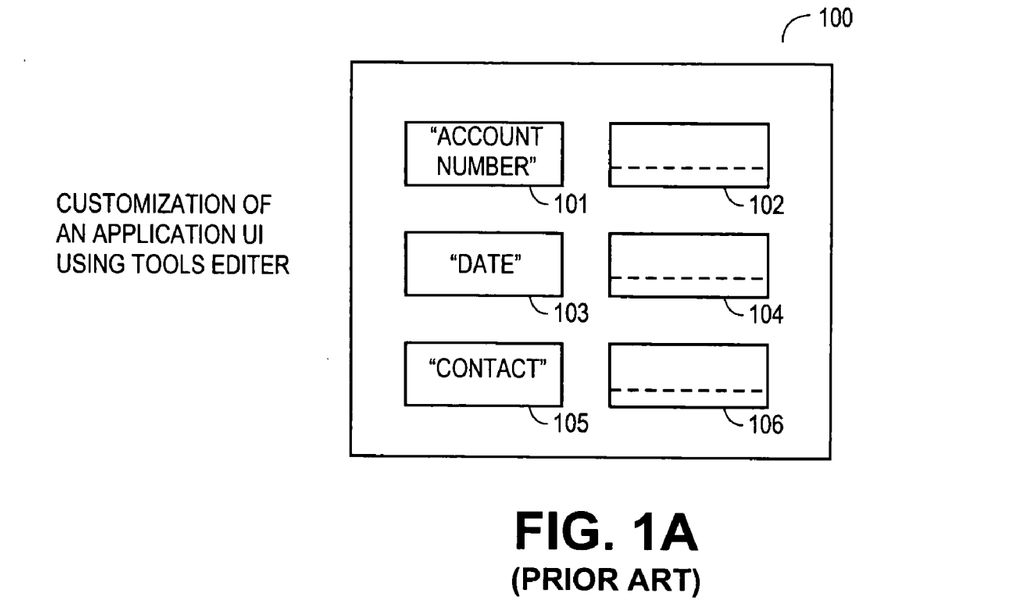
FIGS. 1A and 1B illustrate an application UI template and requirements for customization and modification in accordance with the prior art.
Figure 1B:
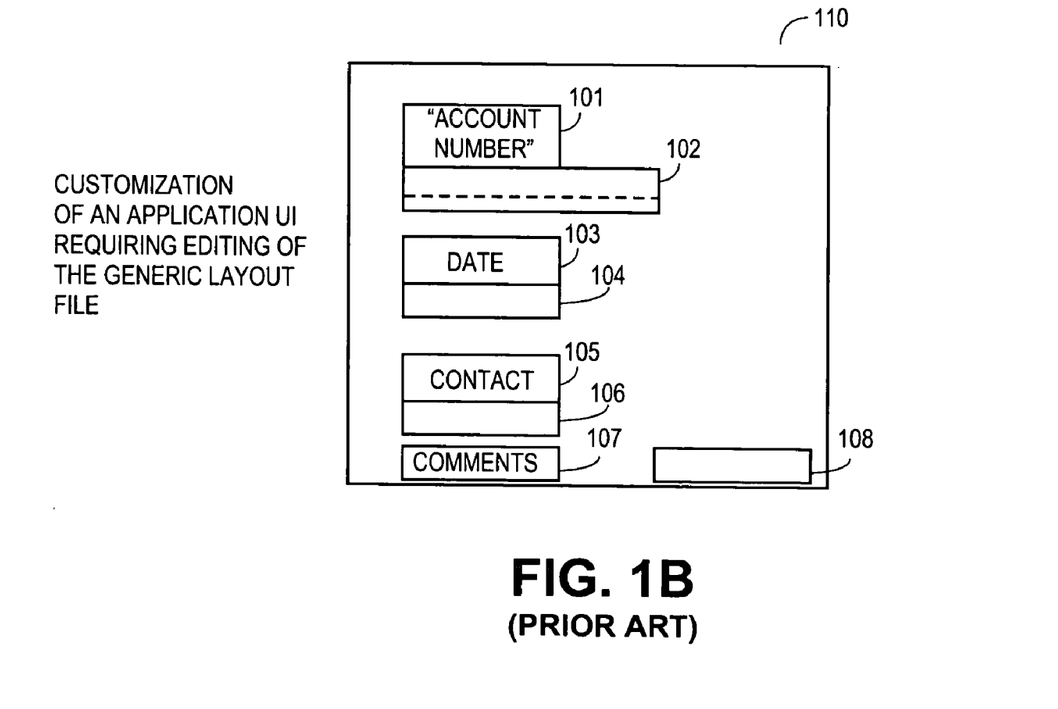

Typically a software vendor will create an application UI template. The HTML code that defines the structure and layout of the application UI template is contained in a generic layout file ("GLF"). The application UI template can be used to configure multiple different application UIs. The application provider obtains the application UI template from the software vendor and customizes the application UI configuration to meet their specific needs. However, the ability to easily modify the application UI template is often quite limited. That is, an application provider can configure the application UI, but modifications to the generic layout require editing the HTML code of the GLF. FIGS. 1A and 1B illustrate an application UI template and requirements for customization and modification in accordance with the prior art. Application UI template 100, shown in FIG. 1A, contains a number of placeholders 101–106. The GLF specifies the number and position of the placeholders, the size of the placeholder is not fixed, and can expand or shrink depending on the UI object placed in it. Using a tools editor, the application provider can then drag objects, such as fields and controls (e.g., fields, push buttons, scroll bars, etc.), and drop them within the placeholders 101–106. That is, the tools editor allows the application provider to move an object from one place to another on a display screen to configure the application UI. This is accomplished, for example, by selecting the object with a pointing device (e.g., a mouse) and directing it to a new location. For example, as shown in FIG. 1, field names, "Account Number," "Date," and "Contact" are placed in placeholders, 101, 103, and 105, respectively. Edit fields corresponding to each field name are placed in placeholders 102, 104, and 106, respectively. A placeholder may be configured to show both the field name and edit field. Internally, only one object is mapped to the placeholder. The particular objects placed within the placeholders constitute an applet, which is a logical user interface entity that displays information to the end user (e.g., a form Applet), which dictates how the application is presented. Information regarding each object (e.g., description of the object) contained in the applet and the corresponding placeholder for each object is kept in a database. Determining the applet (e.g., moving various objects within the existing placeholders) can be accomplished fairly easily using a tools editor. In this way an application provider customizes the application UI template according to the specific needs of the particular application provider. However, the tools editor cannot be used where the application provider desires a more substantial modification to the application UI template (e.g., modifying the generic layout structure). Modifications to the size and position of any of the placeholders, as well as adding or removing placeholders, require editing the HTML code of the GLF. For example, FIG. 1B illustrates a customization of the application UI template 100. In application UI template 110, shown in FIG. 1B, placeholders 102, 104, and 106 have been repositioned so that they are beneath the placeholders containing the corresponding field names. Also, the size of placeholder 102 has been increased (e.g., to accommodate a larger account number). Further, additional placeholders, 107 and 108 have been added to the application UI template to provide a "Comments" field name and corresponding edit field, respectively. In order to make these modifications, the application provider would have to access and edit the HTML of the GLF. The application provider would use a text editor to access the GLF and then make appropriate additions to the HTML, including creating a new HTML to effect the desired layout of the application UI. Depending upon the nature of the modifications desired, this process may require a substantial amount of time and effort. Moreover, editing the GLF requires a fairly high level of expertise and commensurate expense. The cost and effort involved in configuring the application UI beyond the confines of the application UI template is a substantial drawback to current application UI layout schemes.

Another related drawback is the difficulty encountered in migrating applets created in one authoring language to applets formed in another (e.g., migrating non-HTML applets to HTML applets). For example, when mapping controls from, for example, a coordinate-based layout to the placeholders of a typical application UI template, it may not be possible to determine an application UI template that has a placeholder layout that closely matches the coordinate-based layout. Application providers are forced to expend a great deal of time and effort to modify the migrated applets to match the number, size, and position of the original applets.

SUMMARY

Embodiments of the invention provide methods and apparatuses for configuring an HTML-based application UI. For one embodiment, an application provider determines a configuration for a user interface of an application that is received by a processing system. The processing system determines a set of parameters corresponding to the configuration, which may be stored to a database or the file system. Upon a request to access the application, HTML code based upon the configuration parameters is dynamically generated and transmitted to the requesting client processing system.

Other features and advantages of embodiments of the present invention will be apparent from the accompanying drawings and from the detailed description that follow below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Embodiments of the present invention provide methods and apparatuses for quickly and easily configuring an application UI using a flexible GLF that contains a number of commonly used objects and the grid for laying out other objects. For one embodiment, a free-form grid layout is provided that allows an application provider to create a desired number of placeholders, each of a desired size, by positioning objects at desired locations on the free-form grid. A free form grid layout refers to a grid layout that does not have a rigid structure. Using such a layout, an application provider is free to position objects anywhere on a displayed grid without the typical constraints on the size and position of the objects. In this way the application provider configures the application UI. For one embodiment, the placeholders are created by dragging selected objects, from a provided set of objects, onto the grid layout. For such an embodiment, a set of parameters that describe the objects on the grid layout (e.g., indicating number, size, and location) is stored to a database. At run-time, the parameters are used to dynamically generate HTML. For one embodiment, modifications can be made to the application UI without editing a GLF. For one embodiment, a number of commonly used objects (e.g., logos, buttons, etc.) are included in the GLF.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

System

Figure 2:
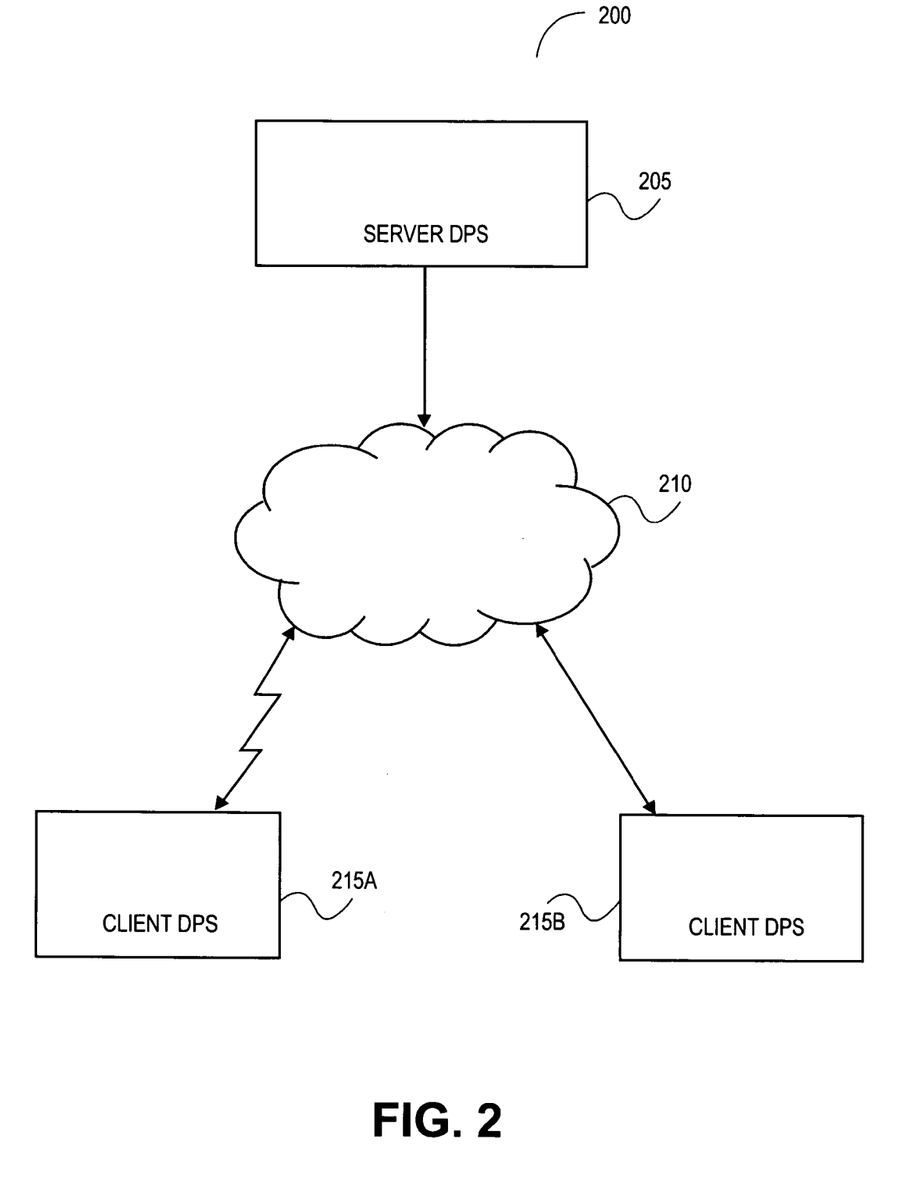
FIG. 2 illustrates a system in which an application UI may be configured by an application provider and presented to an end-user in accordance with one embodiment of the invention.

FIG. 2 illustrates a system in which an application UI may be configured by an application provider and presented by an end-user in accordance with one embodiment of the invention. System 200, shown in FIG. 2, includes a server DPS 205 coupled through Internet 210 to a plurality of client DPSs represented as client DPSs 215a and 215b. Internet 210 is a network of networks through which information is exchanged by methods well known to those skilled in the art (e.g., the use of TCP and IP protocols etc.).

In accordance with one embodiment of the invention, an application provider accesses an application UI template having a free-form grid layout. The application provider configures the application UI by placing desired objects on the grid and sizing the objects as desired. An algorithm, in accordance with one embodiment, stores parameters indicating the application UI configuration to a database. When an end-user accesses the application (e.g., through a web-browser of a client DPS), the algorithm dynamically generates HTML code, based upon the stored parameters. The HTML code is transmitted to the client DPS and executed to display the application UI. Further details regarding this process and the operation of the server DPS 205 and the client DPSs 215a and 215b are provided below.

Process

To configure an application UI in accordance with one embodiment of the invention, the application provider accesses a tools editor. The tools editor reads the GLF for the application UI. The grid layout GLF contains HTML code to sketch out the skeleton of the UI layout. The grid layout tag is embedded in the GLF. The GLF, in accordance with one embodiment, contains a tag that indicates that the application UI has a free-form grid layout. The tag is rendered by the editor tool as a canvas region on which users can lay objects freely. For one embodiment, the GLF may contain objects common to a number of applets (e.g., logos, buttons, etc.) This allows the application provider to configure only the differences in the application UI for each applet.

Figure 3:
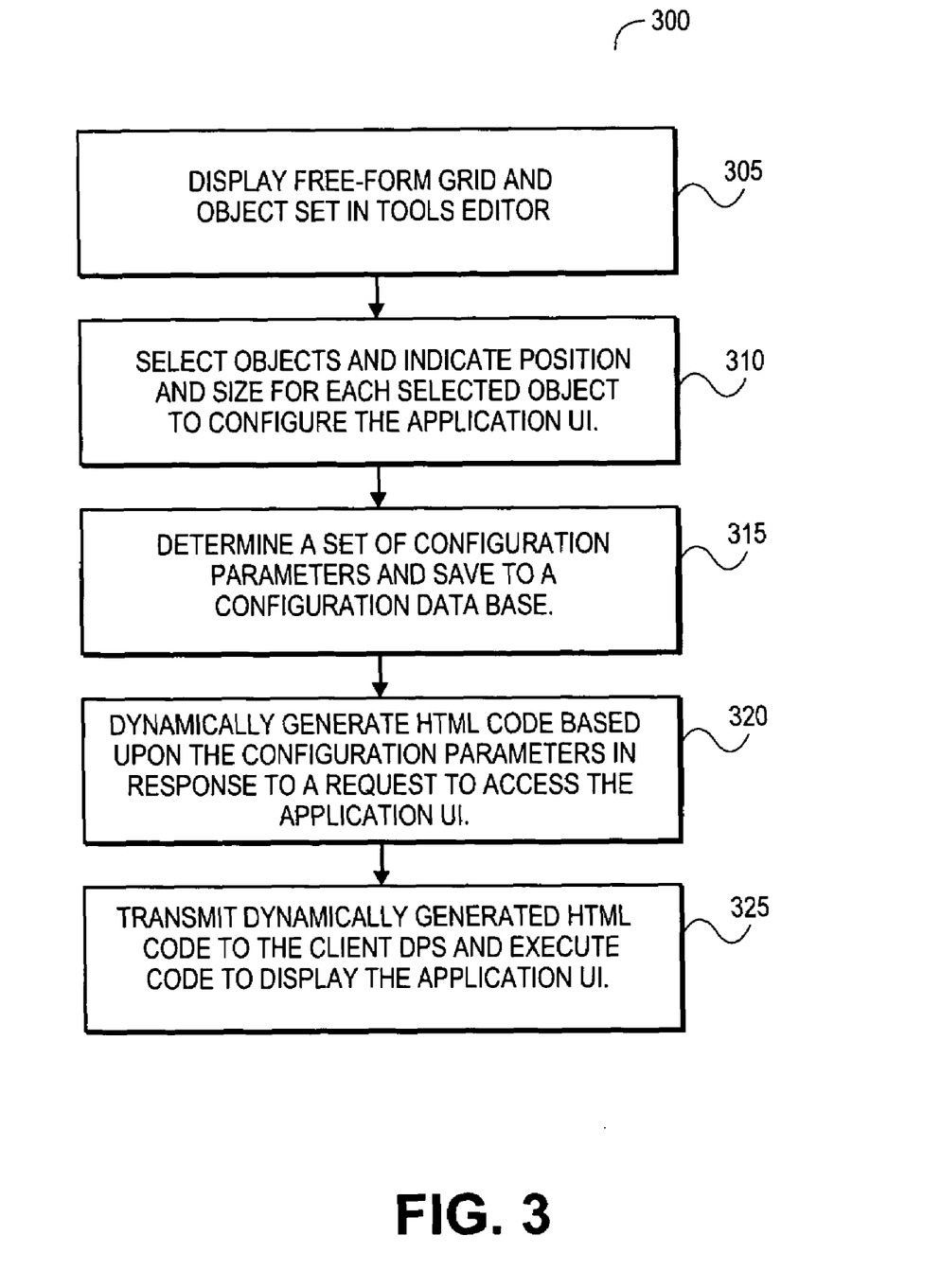
FIG. 3 illustrates a process by which an application UI having a free-form grid layout is configured by an application provider and displayed to an end-user in accordance with one embodiment of the invention.

FIG. 3 illustrates a process by which an application UI having a free-form grid layout is configured by an application provider and displayed to an end-user in accordance with one embodiment of the invention. Process 300, shown in FIG. 3, begins with operation 305 in which a free-form grid, together with a set of objects, is displayed through a tool editor display to the application provider.

Figure 4:
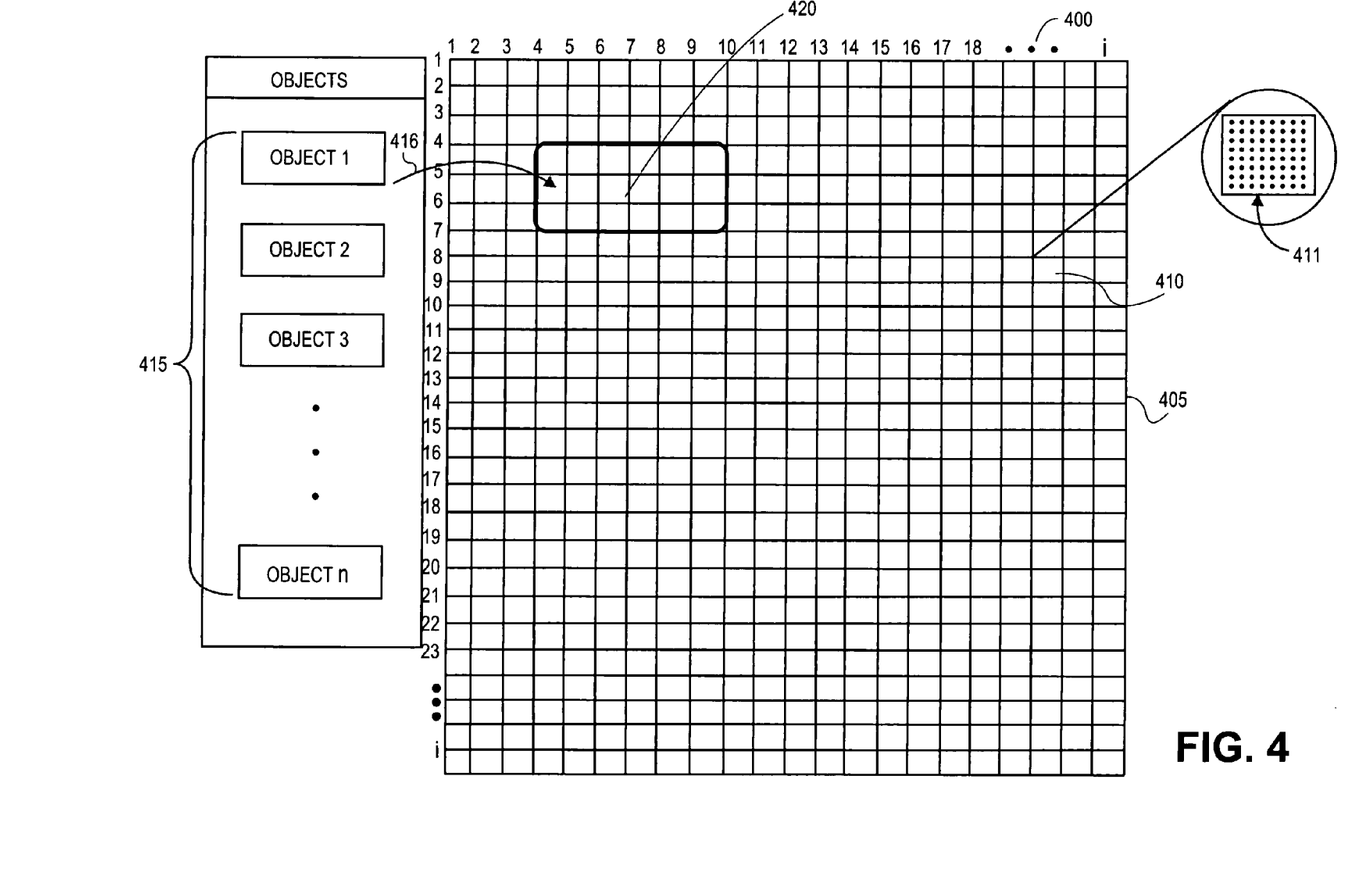
FIG. 4 illustrates an exemplary tool editor display for configuring an application UI in accordance with one embodiment of the invention.

FIG. 4 illustrates an exemplary tool editor display for configuring an application UI in accordance with one embodiment of the invention. Tool editor display 400, shown in FIG. 4, includes a grid 400 composed of a plurality of grid cells 410. Each grid cell contains a rectangular array of pixels 411 having specified dimensions. For one embodiment, each grid cell 410 is an 8×8 array of pixels. In one embodiment, each grid cell 410 may be specified by reference to a column coordinate, 1-i, and a row coordinate 1-j. Tool editor display 400 also includes a set of objects (e.g., fields, controls, etc.) 415.

Referring again to FIG. 3, at operation 310 the application provider configures the application UI by selecting desired objects and indicating a position and size for each selected object. For one embodiment, the application provider indicates the position for an object by positioning the object in a desired location on the free-form grid (e.g., grid 405). For example, referring to FIG. 4, the application provider may drag object 1 as indicated by arrow 416. Object 1, which may be a field name, for example, is thereby positioned in the shaded grid cells 420. Other objects, for example an edit field corresponding to the field name of object 1, are likewise positioned to configure the application UI as desired. The position and number of objects is not restricted as in prior art schemes. Moreover, for one embodiment the application provider can indicate the size of each object and vary the size of each object as desired. For example, each object may have a default size (e.g., 3×6 grid cells), which can be changed by selecting and dragging the object perimeter.

In reference to FIG. 4, the concept of the free-form grid is illustrated in accordance with one embodiment of the invention. In various alternative embodiments the grid 405 may not be visible to the application provider during configuration. In such embodiments the object, once placed on the grid, will shift to the closest grid coordinate.

Referring again to FIG. 3, at operation 315 a set of parameters are determined that indicate the configuration is saved to a database (e.g., a configuration database). The parameters for each object will contain a description of the object (e.g., "name field"), similar to prior art schemes. However, instead of associating an object with one of a fixed set of placeholders that is fixed in position and size, the parameters will indicate the position and size for each selected object. For example, referring to FIG. 4, object 1 may be described as a name field, positioned at grid coordinates 4,4, having a column span of 6 and a row span of 3. In alternative embodiments, the application UI configuration parameters may be stored in various formats that indicate the position and size of each selected object.

Referring again to FIG. 3, at operation 320, in response to an end-user's request to access the application UI, the server DPS will use the configuration parameters to dynamically generate HTML code to present the application UI. Exemplary pseudo code for rendering HTML code based upon the configuration parameters is included as Appendix A.

In accordance with one embodiment, the algorithm of the invention generates different HTML based upon the end-user. For example, depending upon the end-user's role within an organization, access to the application UI may be limited or restricted in some way. In such a case the algorithm may generate HTML code to present a limited view of the application UI for one end-user and may generate HTML code to present another limited view for a different end-user from the same configuration parameters.

At operation 325, the HTML code is transmitted to the client DPS and executed to present the application UI.

General Matters

Embodiments of the invention provide a method for configuring an application UI using a flexible GLF. For one embodiment, the GLF contains only a set of objects common to the corresponding applets of the GLF.

As described above, a tools editor provides the application provider with a free-form grid layout and a set of objects. The application provider selects desired objects and indicates the position of each object in relation to the free-form grid as well as the size of each object. The application provider is no longer restricted in the number, position, and size of objects to configure the application UI. Removal of the restrictions on number, size, and position of the placeholder greatly improves the ability to configure application UI. The benefit of grid layout GLF is two-fold: first, users can easily configure application UI without editing the GLF; second, the free-form GLF allows software vendors to easily construct a layout that resembles the non-HTML application UI. That is, the software vendor does not have to analyze the non-HTML application UI to determine an existing GLF, if any, that fits the UI characteristic.

Figure 5:
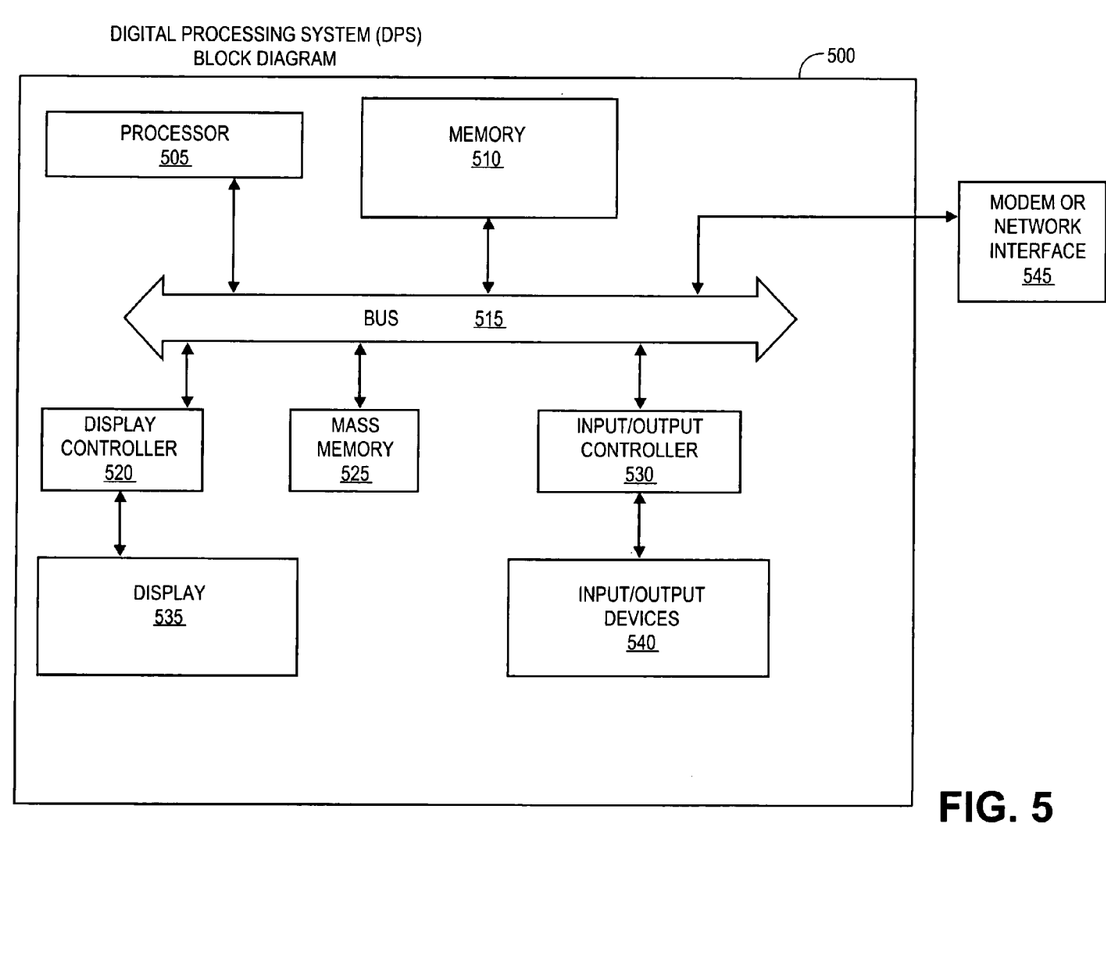
FIG. 5 is a block diagram of a DPS that may be used in accordance with one embodiment of the present invention.

As described above in reference to FIG. 2, a system in which embodiments of the invention may be implemented contain a server DPS coupled through the Internet to a plurality of client DPSs. FIG. 5 is a block diagram of a DPS that may be used in accordance with one embodiment of the present invention. For example, the DPS 500 shown in FIG. 5 may be used as a server DPS or a client DPS. Furthermore, the DPS 500 may be used to perform one or more functions of an Internet service provider. The DPS 500 may be interfaced to external systems through a modem or network interface 545. The modem or network interface may be considered a part of the DPS 500. The modem or network interface may be an analog modem, an ISDN modem, a cable modem, a token ring interface, a satellite transmission interface, a wireless interface, or other interface(s) for providing a data communication link between two or more DPSs.

The DPS 500 includes a processor 505, which may represent one or more processors and may include one or more conventional types of processors, such as Motorola PowerPC processor (available from Motorola, Inc. of Schaumburg, Ill.), an Intel MMX Pentium processor (available from Intel Corporation of Santa Clara, Calif.), etc. A memory 510 is coupled to the processor 505 by a bus 515. The memory 510 may be a dynamic random access memory ("DRAM") and/or may include static RAM ("SRAM"). The processor 505 may also be coupled to other types of storage areas/memories (e.g., cache, flash memory, disk, etc.), which could be considered as part of the memory 510 or separate from the memory 510.

The bus 515 further couples the processor 505 to a display controller 520, a mass memory 525, the modem or network interface 545, and an input/output (I/O) controller 530.

The operations described above in reference to FIGS. 3 and 4, may be implemented by software stored on mass memory 525 depending on the particular DPS and system configuration. For example, the operations of displaying a free-form grid, determining configuration parameters, dynamically generating HTML code based upon the configuration, and transmitting the HTML code to a client DPS may be implemented by software stored upon mass memory 525 of a server DPS. Also, the configuration parameters may be stored to a configuration database contained within mass memory 525. The operations of executing the HTML code and presenting the application UI may be implemented by software stored upon a mass memory 525 of a client DPS.

The mass memory 525 may represent a magnetic, optical, magneto-optical, tape, and/or other type of machine-readable medium/device for storing information. For example, the mass memory 525 may represent a hard disk, a read-only or writeable optical CD, etc. The display controller 520 controls, in a conventional manner, a display 535, which may represent a cathode ray tube ("CRT") display, a liquid crystal display ("LCD"), a plasma display, or other type of display device. The I/O controller 530 controls I/O device(s) 540, which may include one or more keyboards, mouse/track ball or other pointing devices, magnetic and/or optical disk drives, printers, scanners, digital cameras, microphones, etc.

The DPS 500 represents only one example of a system, which may have many different configurations and architectures and which may be employed with the present invention. For example, Macintosh and Intel systems often have multiple busses, such as a peripheral bus, a dedicated cache bus, etc. On the other hand, a network computer, which may be used as a DPS of the present invention, may not include, for example, a hard disk or other mass storage devices, but may receive routines and/or data from a network connection, such as the modem or interface 545, to be processed by the processor 505. Similarly, a Web TV system, which is known in the art, may be considered to be a DPS of the present invention, but such a system may not include one or more I/O devices, such as those described above with reference to I/O device(s) 540. Additionally, a portable communication and data processing system, which may employ a cellular telephone and/or paging capabilities, may be considered a DPS that may be used with the present invention.

In the system 500 shown in FIG. 5, the mass memory 525 (and/or the memory 510) may store media (e.g., applications) that may be processed according to the present invention. Alternatively, media data may be received by the DPS 500, for example, via the modem or network interface 545, and stored and/or presented by the display 535 and/or the I/O device(s) 540. In one embodiment, data may be transmitted across a data communications network, such as a LAN and/or the Internet.

In the foregoing specification, the invention has been described with reference to specific exemplary embodiments thereof. It will, however, be evident to those skilled in the art that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for generating a user interface of an application, the method comprising:
   receiving a configuration for the user interface of the application;
   determining a set of configuration parameters corresponding to the configuration; and
   in response to a request by a user, dynamically generating user interface display code at run time, wherein
      the user interface code is based upon the set of configuration parameters and a role of the user within an organization,
      the configuration parameters are configured to indicate a position and a size for each selected object of a plurality of objects,
      the position and the size for each selected object is a location in a free-form grid layout, and the position and the size for each selected object are user-defined.

2. The method of claim 1 further comprising:
   transmitting the user interface display code to a client digital processing system in response to a request to access the application.

3. The method of claim 1, wherein the configuration for the user interface is determined by selecting one or more objects and positioning each of the one or more objects selected in a desired location of the free-form grid layout.

4. The method of claim 2, wherein the request is communicated through the Internet and the user interface display code is hypertext markup language (HTML) code.

5. The method of claim 3, wherein the one or more objects are selected using a user input device and each of the one or more objects selected is positioned by dragging the object to the desired location of the free-form grid layout.

6. The method of claim 5, further comprising:
   indicating a desired size for each of the one or more objects selected.

7. The method of claim 6, wherein indicating a desired size for each of the one or more objects selected includes selecting a perimeter of the object at a first location on the free-form grid layout and dragging the perimeter to a second location on the free-form grid layout.

8. The method of claim 3, wherein the free-form grid layout comprises a plurality of grid cells and the set of configuration parameters includes information indicating a position of each of the one or more objects in reference to one or more of the plurality of grid cells.

9. The method of claim 8, wherein the set of configuration parameters includes a grid coordinate specifying one of the plurality of grid cells, a column span specifying a first dimension, and a row span specifying a second dimension for each of the one or more objects.

10. A system for generating a user interface of an application, the system comprising:
    a storage device configured to store a set of configuration parameters corresponding to a configuration of the user interface of the application; and
    a processor, coupled to the storage device and configured to dynamically generate user interface display code at run time, wherein
       the user interface display code is dynamically generated at run time in response to a request from a client device to access the application and a request by a user,
       the user interface display code is based upon the set of configuration parameters and a role of the user within an organization,
       the configuration parameters are configured to indicate a position and a size for each selected object of a plurality of objects,
       the position and the size for each selected object is a location in a free-form grid layout, and the position and the size for each selected object are user-defined.

11. The system of claim 10, wherein the client device is coupled to the processor through the Internet and the user interface display code is hypertext markup language (HTML) code.

12. The system of claim 10, wherein the configuration is determined by selecting one or more objects and positioning each of the one or more objects selected in a desired location of the free-form grid layout.

13. The system of claim 12, wherein positioning each of the one or more objects selected in the desired location of the free-form grid layout includes indicating a desired size for each of the one or more objects selected.

14. The system of claim 13, wherein indicating the desired size for each of the one or more objects selected includes selecting a perimeter of the object at a first location on the free-form grid layout and dragging the perimeter to a second location on the free-form grid layout.

15. The system of claim 12, wherein the free-form grid layout comprises a plurality of grid cells and the set of configuration parameters includes information indicating a position of each of the one or more objects selected in reference to one or more of the plurality of grid cells.

16. The system of claim 15 wherein the set of configuration parameters includes a grid coordinate specifying one of the plurality of grid cells, a column span specifying a first dimension, and a row span specifying a second dimension for each of the one or more objects.

17. A machine-readable medium that provides instructions, which when executed by a processing system, cause the processing system to perform a method for generating a user interface of an application, the method comprising:
   accessing a generic layout file for the user interface of the application, the generic layout file having a free-form grid layout and a set of objects;
   creating a configuration for a user interface of an application;
   determining a set of configuration parameters corresponding to the configuration; and
   in response to a request by a user, dynamically generating user interface display code at run time, wherein
      the user interface display code is based upon the set of configuration parameters and a role of the user within an organization,
      the configuration parameters are configured to indicate a position and a size for each selected object of a plurality of objects,
      the position and the size for each selected object is a location in a free-form grid layout, and the position and the size for each selected object are user-defined.

18. The machine-readable medium of claim 17 further comprising:
   transmitting the user interface display code to a client digital processing system in response to a request to access the application.

19. The machine-readable medium of claim 17, wherein the configuration for the user interface is determined by selecting one or more objects and positioning each of the one or more objects selected in a desired location of the free-form grid layout.

20. The machine-readable medium of claim 18, wherein the request is communicated through the Internet and the user interface display code is hypertext markup language (HTML) code.

21. The machine-readable medium of claim 19, wherein the one or more objects are selected using a user input device and each of the one or more objects selected is positioned by dragging the object to the desired location of the free-form grid layout.

22. The machine-readable medium of claim 21, wherein the method further comprises indicating a desired size for each of the one or more objects selected.

23. The machine-readable medium of claim 22, wherein indicating a desired size for each of the one or more objects selected includes selecting a perimeter of the object at a first location on the free-form grid layout and dragging the perimeter to a second location on the free-form grid layout.

24. The machine-readable medium of claim 19, wherein the free-form grid layout comprises a plurality of grid cells and the set of configuration parameters includes information indicating a position of each of the one or more objects in reference to one or more of the plurality of grid cells.

25. The machine-readable medium of claim 24, wherein the set of configuration parameters includes a grid coordinate specifying one of the plurality of grid cells, a column span specifying a first dimension, and a row span specifying a second dimension for each of the one or more objects.

* * * * *